July 19, 1949.  N. P. DARASH  2,476,586
RETAINING RING
Filed Dec. 13, 1944
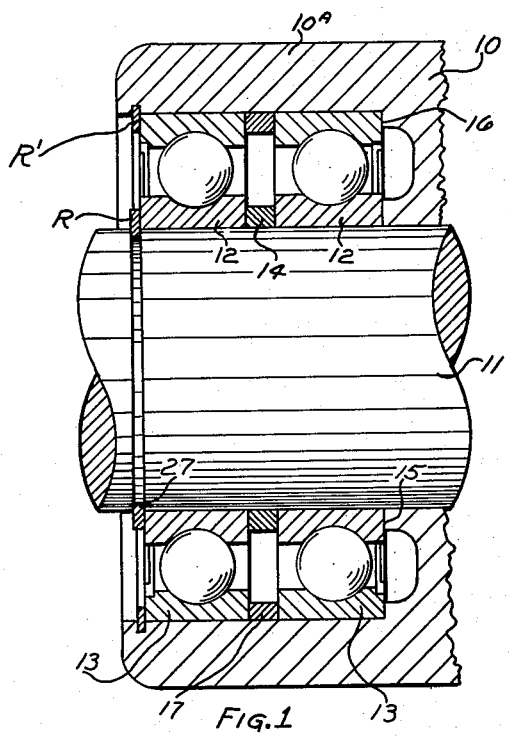
FIG. 1
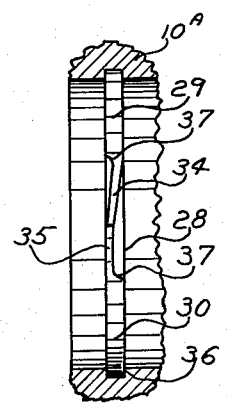
FIG. 4
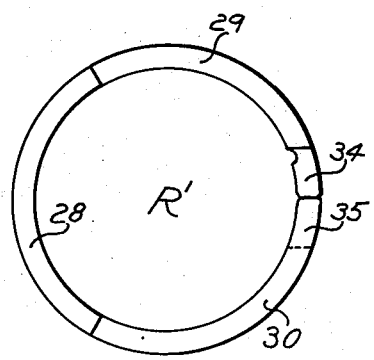
FIG. 5
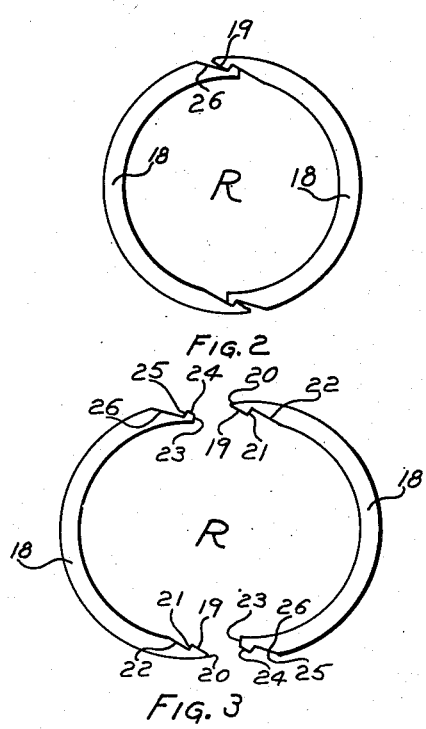
FIG. 2
FIG. 3
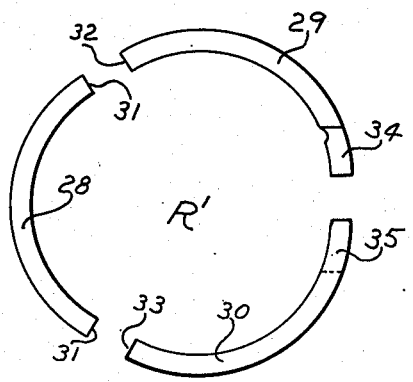
FIG. 6
INVENTOR.
NICHOLAS P. DARASH
BY
Kwis Hudson Boughton & Williams
ATTORNEYS Patented July 19, 1949

2,476,586

UNITED STATES PATENT OFFICE 2,476,586

RETAINING RING

Nicholas P. Darash, Cleveland, Ohio, assignor to Eaton Manufacturing Company, Cleveland, Ohio, a corporation of Ohio Application December 13, 1944, Serial No. 568,057

1 Claim. (Cl. 85—8.5)

This invention relates to retaining rings such as are used to retain inner and outer bearing races in place on a shaft and in the supporting housing for the bearing, or to retain closure or other members in position on or in a supporting structure or for various other uses.

The retaining rings embodying the present invention are illustrated and described herein as employed for retaining the inner and outer bearing races in position on a shaft and in the supporting housing, but it will be understood that this disclosure is simply by way of example and not by way of limitation.

Heretofore, retaining rings of the character specified have been made of spring metal and have taken the form of split rings which, when placed in their operative positions depend on their inherent spring action to contract or expand, as the case may be, and hold themselves in operative position. This has necessitated the use of expensive high grade metal, such as spring steel, in constructing the retaining rings. Also it has been necessary in applying the rings to expand the same over the shaft which the bearing supports and there is ever present the likelihood of expanding the rings beyond their elastic limits and thus giving the rings a permanent set which renders the rings unsuitable for effective use. Likewise in the case of the retaining rings for the inner bearing race there exists the effect of centrifugal action on the rings which tends to expand the rings and may result in the same getting out of operative position.

An object of the invention is to provide retaining rings of the character referred to and which rings can be economically manufactured since they need not be formed of high grade spring metal and which also can be applied and removed for the purposes desired with facility.

Another object is to provide a retaining ring such as can be used for holding the inner race of a bearing and which ring will not loosen and shift out of operative position under the action of centrifugal force, but on the contrary will be more securely retained in operative position as the centrifugal force increases.

Further and additional objects and advantages not hereinbefore specified will become apparent during the detailed description which is to follow.

Referring to the accompanying drawing,

Fig. 1 is a fragmentary sectional view through a supporting frame or structure which rotatably mounts a shaft and includes an antifriction bearing for the shaft; the supporting frame or structure and the bearing races being shown in section while the shaft is shown in elevation.

Fig. 2 is an assembled elevationl view of a retaining ring embodying the invention and which is shown in Fig. 1 mounted in position to retain the inner race of the bearing against axial movement toward the left.

Fig. 3 is a view of the retaining ring shown in Fig. 2 but shows the separable portions of the ring disconnected.

Fig. 4 is a view on a smaller scale than Fig. 1 and is partly in section and partly in elevation and shows a retaining ring embodying the invention and which is used for retaining the outer race of the bearing shown in Fig. 1 against shifting movement toward the left.

Fig. 5 is an assembled elevational view of the retaining ring shown in Fig. 4, and Fig. 6 is an elevational view of the retaining ring shown in Figs. 4 and 5 with the portions thereof separated.

Referring to Fig. 1, the supporting frame or structure is indicated at 10 and the rotatable shaft mounted by said frame or structure at 11. A portion 10$^a$ of the frame or structure forms a housing for the antifriction bearing which supports the shaft 11. This bearing is illustrated as a pair of bearings spaced axially of the shaft and each bearing includes an inner race 12 and an outer race 13. The inner races 12 of the bearings abut and are separated by a spacer member 14 which surrounds the shaft 11. The right hand inner race 12 is held against axial movement relative to the shaft 11 by the spacer member 14 and by an annular shoulder 15 formed in the frame or support 10. The left hand inner race 12 is held against axial movement upon the shaft 11 by the spacer member 14 and by a retaining ring R embodying the present invention. The right hand outer race 13 is held between a shoulder 16 and a spacer member 17, while the left hand outer race 13 is shown as held between the spacer member 17 and a retaining ring R$^1$ embodying the present invention. The structure of the bearing and the manner in which it is mounted in the housing is, with the exception of the retaining rings R and R$^1$, old and well known in the art and per se forms no part of the present invention and therefore need not be described herein with greater exactitude.

The retainer ring R is illustrated in Figs. 2 and 3 and is formed of a plurality of separable symmetrical semicircular parts or portions 18, which in the illustrated form happen to be two in number. Each part 18 is provided at one end and on its inner side with an inclined surface 19, wherefore said end of each part is pointed as indicated at 20. Inwardly of said end and at the inner end of the inclined surface 19, each part 18 is recessed to provide a shoulder 21 and an inclined surface 22 which is substantially parallel to the inclined surface 19. The opposite end of each part 18 is formed with a flat surface 23 that extends when the parts are assembled, substantially in a radial direction. At the outer end of the surface 23 each part 18 has an inclined surface 24 adapted to cooperate with the inclined surfaces 19 and 22 of the other part 18 when the two parts are in assembled relationship. Each part 18 at said other end is provided with a shoulder 25 that merges with the inclined surface 24 and an inclined surface 26. In applying the retaining ring R, the separate parts or portions thereof are passed over the shaft 11 and positioned in the annular groove 27 formed in the periphery of the shaft 11. The two parts 18 are moved radially toward each other to cause the inclined surfaces 19 to engage and ride upwardly on the inclined surfaces 24 until the shoulders 21 can snap behind the shoulders 25, at which time the parts 18 will be in the relationship shown in Fig. 2. It will be understood that although the parts 18 need not be made of high grade spring metal since they do not depend upon the inherent spring action to retain themselves in position in the groove 27 that the material of such parts will possess sufficient inherent spring action however to cause the shoulders 21 to snap behind the shoulders 25 as just referred to.

It will be seen that the parts 18, when in the assembled relationship shown in Fig. 2, are securely interlocked and that the effect of the centrifugal forces to which the assembled parts may be subjected is to more securely interlock said assembled parts together, it being recalled that in the usual retaining ring formed of high grade spring metal and relying on its inherent contraction ability to retain itself on the shaft, that centrifugal forces acting thereon tend to expand the ring and thus loosen its grip on the shaft.

The retaining ring R not only can be made of relatively inexpensive material but since the parts 18 are symmetrical the various inclined surfaces and shoulders on the ends of said parts can be formed simultaneously on a number or gang of the parts. When occasion requires the removal of the ring R from the shaft 11, it is merely necessary to insert the pointed end of a suitable tool such as a screw driver between the inclined divergent surfaces 19 and 26 to pry the shoulders 21 out of contacting engagement with the shoulders 25, whereupon the parts 18 are disconnected from each other and can be readily removed from the groove 27 in the shaft 11.

Referring to Figs. 5 and 6 the retaining ring R¹ will be seen as formed of a plurality of separate arcuate portions or parts, in this instance three such parts, namely 28, 29, and 30. The parts 28, 29, and 30, when assembled as indicated in Fig. 5, form a complete ring. The part 28 is simply an arcuate section of the ring and has flat radially extending end surfaces 31 which, when the parts are assembled, contact complementary end surfaces 32 and 33 of the parts 29 and 30. The part 29 adjacent its other end is cut away to reduce its thickness and to provide a thin sectioned tongue portion 34 which is disposed at an inclination to the plane of the ring that is normal to the axis thereof. The part 30 of the retaining ring R¹ is provided at its end opposite to its end 33 with a tongue 35 of reduced thickness and which tongue lies in the plane of the ring that is normal to the ring axis.

The parts 28, 29 and 30 when assembled act as a retainer ring for the outer race 13 and are mounted in an annular groove 36 formed internally of the bearing housing support 10ᵃ. The parts of the retaining ring R¹ are placed in the groove 36 with the end surfaces 32 and 33 of the parts 29 and 30 in abutting engagement with the end surfaces 31 of the part 28. At this time the tongues 34 and 35 of the parts 29 and 30 slightly overlap but when force is applied to spread said parts in the plane of the ring, the tongues are slightly flexed relative to each other due to the inclination of the tongue 34 and move from this overlapped relationship into end to end abutting engagement as indicated in Fig. 4, and at such time the parts are securely retained in the groove 36. The spreading force may be applied to the parts 29 and 30 by means of suitable tools engaging in the notches 37 formed in said parts.

Referring to Fig. 4 it will be seen that the tongue 35 of the part 30 contacts throughout its length one side of the groove 36 while the end of the tongue 34 also contacts said side of the groove. This side of the groove, which is the left side as viewed in Figs. 1 and 4, takes the end thrust applied to the retaining ring by the shaft through the bearing and thus the tendency in use of the ring R¹ is for the tongues 34 and 35 to stay in the position indicated in Fig. 4.

When it is desired to remove the ring R¹ a screw driver or other suitable tool can be inserted in the groove 36 to the left of the tongue 34 as viewed in Fig. 4 and said tongue pried toward the right to disengage its end from the end of the tongue 35 and to allow the tongues 34 and 35 to assume an overlapped relationship, whereupon the ring contracts and the parts 28, 29 and 30 thereof can be removed.

From the foregoing description it will have been seen that the objects enumerated herein are adequately attained by retaining rings embodying the present invention and that no reliance on the inherent spring action of the ring material is required for holding the rings in operative position.

Although preferred embodiments of the invention have been illustrated and described herein, it will be understood that the invention is susceptible of various modifications and adaptations within the scope of the appended claim.

Having thus described my invention, I claim:

A ring for locking a bearing race in position and for taking the axial thrust of said race and adapted to be mounted in a groove formed in the member which supports said race, said ring comprising separate arcuate resilient portions having a width in a radial direction of the ring less than one quarter of the outside radius of the ring but so proportioned as to fill said groove and to provide when assembled in said groove a circular abutting surface for said race, said portions having their adjacent ends formed to cooperatively contact each other to maintain the portions in complete ring formation in said groove, certain of said contacting ends being in the form of tongues reduced in cross-sectional thickness with respect to said portions and with tongues angularly disposed relative to each other and providing for the flexing of said certain ends relative to each other during the assembly of said portions to bring the ends of said tongues into abutting engagement with each other, said tongues also providing a space between said ring and the walls of said groove into which a suitable tool can be inserted for relatively flexing said tongues out of said abutting relationship when disassembling said portions.

NICHOLAS P. DARASH.

REFERENCES CITED

The following references are of record in the file of this patent:

UNITED STATES PATENTS

| Number | Name | Date |
|---|---|---|
| 838,976 | George | Dec. 18, 1906 |
| 948,600 | Vanney | Feb. 8, 1910 |
| 1,070,983 | Philbon et al. | Aug. 19, 1913 |
| 1,288,973 | Osborn | Dec. 24, 1918 |
| 1,652,272 | Dawson | Dec. 13, 1927 |

FOREIGN PATENTS

| Number | Country | Date |
|---|---|---|
| 12,798 | Great Britain | June 3, 1907 |